(12) United States Patent
Tanaka et al.

(10) Patent No.: US 8,118,363 B2
(45) Date of Patent: Feb. 21, 2012

(54) TAPE-SHAPED LOCKING MEMBER FOR SEAT SKIN MATERIAL FIXATION, AND PROCESS FOR PRODUCING RESIN MOLDED PRODUCT WITH LOCKING MEMBER

(75) Inventors: Takaaki Tanaka, Osaka (JP); Shiro Ogawa, Osaka (JP); Keiji Takehara, Hyogo (JP)

(73) Assignee: Kuraray Fastening Co., Ltd., Osaka-shi (JP)

( * ) Notice: Subject to any disclaimer, the term of this patent is extended or adjusted under 35 U.S.C. 154(b) by 112 days.

(21) Appl. No.: 12/669,296

(22) PCT Filed: Jul. 8, 2008

(86) PCT No.: PCT/JP2008/062329
§ 371 (c)(1),
(2), (4) Date: Jan. 15, 2010

(87) PCT Pub. No.: WO2009/013998
PCT Pub. Date: Jan. 29, 2009

(65) Prior Publication Data
US 2010/0181817 A1 Jul. 22, 2010

(30) Foreign Application Priority Data
Jul. 20, 2007 (JP) ................. 2007-005576

(51) Int. Cl.
*A47C 31/02* (2006.01)
*A44B 18/00* (2006.01)

(52) U.S. Cl. ................... 297/218.2; 24/306; 24/442

(58) Field of Classification Search ............ 297/218.2; 24/306, 442–452
See application file for complete search history.

(56) References Cited

U.S. PATENT DOCUMENTS

| | | | | |
|---|---|---|---|---|
| 3,192,589 A | * | 7/1965 | Pearson | 24/452 |
| 3,266,841 A | * | 8/1966 | Altman | 297/220 |
| 3,685,474 A | * | 8/1972 | Frohlich et al. | 29/410 |
| 4,069,781 A | * | 1/1978 | Andersson | 112/438 |
| 4,470,857 A | * | 9/1984 | Casalou | 156/66 |
| 4,563,380 A | * | 1/1986 | Black et al. | 428/100 |
| 4,792,111 A | * | 12/1988 | Taguchi | 249/83 |
| 4,931,344 A | * | 6/1990 | Ogawa et al. | 428/100 |
| 4,933,224 A | * | 6/1990 | Hatch | 428/100 |
| 5,236,243 A | * | 8/1993 | Reyes | 297/219.1 |
| 5,286,431 A | * | 2/1994 | Banfield et al. | 264/134 |
| 5,662,853 A | * | 9/1997 | Hattori et al. | 264/219 |
| 5,671,511 A | * | 9/1997 | Hattori et al. | 24/444 |
| 5,702,159 A | * | 12/1997 | Matsuoka et al. | 297/452.48 |

(Continued)

FOREIGN PATENT DOCUMENTS
JP 04 338402 11/1992
(Continued)

*Primary Examiner* — Rodney B White
(74) *Attorney, Agent, or Firm* — Oblon, Spivak, McClelland, Maier & Neustadt, L.L.P.

(57) ABSTRACT

A tape-shaped engaging member F for fixing an upholstery material to seats, which includes a hook surface fastener composed of a double Raschel-knitted base fabric 1 and projecting mushroom-type fastening elements 2 on the surface of the base fabric and a foamed resin layer 3 integrally united to the back surface of the hook surface fastener, and a method of producing a resin molded article equipped with the engaging member. The tape-shaped engaging member is easily set to a mold, has good in-plane flexibility and deforms in good conformity with three-dimensionally curved surfaces.

15 Claims, 3 Drawing Sheets

U.S. PATENT DOCUMENTS

| | | | |
|---|---|---|---|
| 5,713,111 A * | 2/1998 | Hattori et al. | 24/452 |
| 5,725,928 A * | 3/1998 | Kenney et al. | 428/100 |
| 5,826,939 A * | 10/1998 | Beyer | 297/218.3 |
| 5,858,159 A * | 1/1999 | Holbrook et al. | 156/256 |
| 5,932,311 A * | 8/1999 | Kenney et al. | 428/100 |
| 5,945,193 A * | 8/1999 | Pollard et al. | 428/100 |
| 5,972,465 A * | 10/1999 | Ohno et al. | 428/100 |
| 6,000,106 A * | 12/1999 | Kampfer et al. | 24/452 |
| 6,129,970 A * | 10/2000 | Kenney et al. | 428/100 |
| 6,148,487 A * | 11/2000 | Billarant | 24/442 |
| 6,206,467 B1 * | 3/2001 | Mense et al. | 297/218.2 |
| 6,334,969 B1 * | 1/2002 | Hosokawa | 264/46.4 |
| 6,348,252 B1 * | 2/2002 | Kenney et al. | 428/100 |
| 6,443,525 B1 * | 9/2002 | Haupt | 297/452.6 |
| 6,460,230 B2 * | 10/2002 | Shimamura et al. | 24/452 |
| 6,463,635 B2 * | 10/2002 | Murasaki | 24/452 |
| 6,561,581 B2 * | 5/2003 | Michot et al. | 297/218.2 |
| 6,588,838 B1 * | 7/2003 | Dick et al. | 297/216.13 |
| 6,647,600 B1 * | 11/2003 | Jost et al. | 24/442 |
| 6,694,576 B1 * | 2/2004 | Fujisawa et al. | 24/452 |
| 6,854,805 B2 * | 2/2005 | Fujita et al. | 297/452.56 |
| 6,921,132 B2 * | 7/2005 | Fujita et al. | 297/216.13 |
| 7,044,551 B2 * | 5/2006 | Fujita et al. | 297/284.4 |
| 7,077,473 B2 * | 7/2006 | Demain et al. | 297/228.13 |
| 7,090,300 B2 * | 8/2006 | Fujita | 297/452.49 |
| 7,416,256 B2 * | 8/2008 | Fujita et al. | 297/452.56 |
| 7,425,360 B2 * | 9/2008 | Line et al. | 428/99 |
| 7,481,493 B2 * | 1/2009 | Fujita et al. | 297/284.2 |
| 7,496,457 B2 * | 2/2009 | Fujita et al. | 702/56 |
| 7,618,096 B2 * | 11/2009 | Fujita et al. | 297/452.56 |
| 7,648,751 B2 * | 1/2010 | Janzen et al. | 428/99 |
| 7,678,318 B2 * | 3/2010 | Line et al. | 264/274 |
| 2005/0238842 A1 * | 10/2005 | Schindzielorz et al. | 428/86 |

FOREIGN PATENT DOCUMENTS

| | | |
|---|---|---|
| JP | 7 184708 | 7/1995 |
| JP | 09 000316 | 1/1997 |
| JP | 11 276214 | 10/1999 |
| JP | 3255384 | 11/2001 |
| JP | 3794801 | 4/2006 |

* cited by examiner

TAPE-SHAPED LOCKING MEMBER FOR SEAT SKIN MATERIAL FIXATION, AND PROCESS FOR PRODUCING RESIN MOLDED PRODUCT WITH LOCKING MEMBER

TECHNICAL FIELD

The present invention relates to a tape-shaped engaging member having a hook surface fastener which is used in fixing an upholstery material to automotive seats, more particularly, relates to a flexible tape-shaped engaging member having a hook surface fastener made of a Raschel-knitted fabric which is used in fixing an upholstery material to seats and a production of a resin molded article having the engaging member.

BACKGROUND ART

A method of attaching an upholstery material to a seat pad for automotive seat (hereinafter may be simply referred to as "seat") includes a hog ring method in which the metal wires embedded in both urethane cushion and upholstery material are fixed by a metal ring; an adhesive method in which cushion and upholstery material are fixed by an adhesive; and a surface fastener mold-in method in which a plastic hook surface fastener embedded in cushion is engaged with a loop surface fastener sewed on the back surface of upholstery material. Recently, the seating portion and backrest of automotive seats are often made into curved shapes in order to easily hold a seating person in position or give a good comfort. Of the above methods, the surface fastener mold-in method is the most preferred in view of easiness of production and easiness of disassembling operation for recycle. However, this method is difficult to be applied to seats with curved surfaces.

An engaging member for use in a mold-in process of a surface fastener which is applicable to curved surfaces of seats is also studied. Patent Document 1 discloses a fastener member in which a plurality of projections with truncated pyramid shape are formed on the base of a tape engaging member, and fastening elements are formed on the surface of the projections, thereby making the tape member deformable in conformity with curved surfaces.

Patent Document 2 discloses a flexible engaging member for mold-in process in which a surface fastener tape is wound and adhered to the surface of a flexible rod having a circular cross-section in a spiral or parallel manner.

Patent Document 3 discloses a hook surface fastener produced by cutting monofilaments which connect two double Raschel-knitted base fabrics at their central portions and melting the tip ends of cut monofilaments which project outwardly from the resulting fabrics. However, the hook surface fastener described in Patent Document 3 is a self-engaging surface fastener having a top hook surface and a back loop surface. Therefore, this patent document describes nothing about integrally uniting a foamed resin layer to the back surface, which is employed in the present invention as described below, and also describes nothing about the mold-in process. In addition, Patent Document 3 is completely silent about the deformation of the resulting surface fastener in conformity with two-dimensionally or three-dimensionally curved surface.

Patent Document 4 describes a self-gripping tape having a hook surface fastener and a foamed layer adhered to the back surface of the hook surface fastener. The base fabric for the hook surface fastener is a knitted fabric and the resulting self-gripping tape is used as a means for attaching a cover material to a foamed cushion for automotive seats. It is described that the self-gripping tape is deformable in its own plane because the base fabric is made of a knitted fabric. However, Patent Document 4 describes nothing about a hook surface fastener which is produced by cutting connecting yarns of a double Raschel-knitted fabric and melting the tip ends of cut yarns into enlarged heads, the use of a surface fastener in mold-in process, and the mold-in process in which a surface fastener is inserted into a recessed portion disposed in a mold and introducing a foamable resin liquid into the mold while keeping the surface fastener in position. This patent document also describes nothing about the effect of the foamed layer united to the back surface for preventing the fastening element surface from being covered with the foamable resin liquid and the effect of the foamed layer for enhancing the ability of deformation in conformity with three-dimensionally curved surfaces. Thus, Patent Document 4 also fails to describe or suggest the subject matter and the effect of the present invention.

Patent Document 1: JP 3794801B
Patent Document 2: JP 3255384B
Patent Document 3: JP 7-184708A
Patent Document 4: JP 11-276214A

DISCLOSURE OF THE INVENTION

Problems to be Solved by the Invention

The engaging members for mold-in process described in Patent Documents 1 and 2 are insufficient in the deformation in conformity with curved surfaces, and therefore, are not set in position easily in a mold for embedding the engaging member into shaped articles. In addition, the molding resin easily flows into the surface having the fastening elements, and the in-plane flexibility and the conformability to three-dimensionally curved surfaces are poor. Patent Documents 3 and 4 also fail to describe the use of the self-gripping tapes in the mold-in process.

In view of the above problems in the prior art, an object of the present invention is to provide a tape-shaped engaging member which is easily set in position in a mold, which has a good in-plane flexibility and which deforms easily in conformity with three-dimensionally curved surfaces.

Means for Solving the Problems

As a result of extensive research in view of rationally solving the above problems in known tape-shaped engaging members, the inventors have found that the problems are solved by a tape-shaped engaging member which comprises a hook surface fastener composed of a double Raschel-knitted base fabric and projecting hook fastening elements on the surface of the base fabric and a foamed resin layer integrally united to the back surface of the hook surface fastener. The present invention is based on this finding.

Thus, the present invention provides:

(1) a tape-shaped engaging member for fixing an upholstery material to seats, which comprises a hook surface fastener comprising a double Raschel-knitted base fabric and projecting hook fastening elements on the surface of the base fabric and a foamed resin layer integrally united to the back surface of the hook surface fastener;

(2) the tape-shaped engaging member (1) wherein the hook fastening elements are mushroom-type fastening elements which are formed by cutting yarns connecting two double Raschel-knitted base fabrics and melting the tip ends of the cut monofilaments which project outwardly from the resulting base fabric;

(3) the tape-shaped engaging member (1) or (2) wherein the height of the fastening elements is 1.0 to 2.0 mm and the density of hook fastening elements is 45 to 65/cm$^2$;

(4) any one of the tape-shaped engaging members (1) to (3) wherein the foamed resin layer is a polyurethane foamed layer;

(5) any one of the tape-shaped engaging members (1) to (4) wherein the in-plane flexibility of the tape-shaped engaging member is 2.0 mm or less when expressed by a center-plane floating distance which is a distance between a plane and a central portion of an arced tape-shaped engaging member determined by bending the tape-shaped engaging member along a ¼ circular arc with a ¹⁄₄₀ mm curvature on the plane;

(6) a method of producing a resin molded article having an engaging member, which comprises setting any one of the tape-shaped engaging members (1) to (5) in a recessed portion disposed inside a mold with the surface having the fastening elements facing toward the bottom the recessed portion; introducing a foamable resin into the mold; allowing the foamable resin to foam and solidify to form a molded article having the engaging member; and releasing the molded article having the engaging member from the mold;

(7) the method (6) wherein the width of the recessed portion is the same as or slightly narrower than the width of the foamed resin layer integrally united to the back surface of the hook surface fastener, and the foamed resin layer is inserted into the recessed portion when setting the engaging member into the recessed portion;

(8) a seat molded article made of a foamed resin body and having a tape-shaped engaging member in a predetermined portion of the seat molded article, wherein the tape-shaped engaging member comprises a hook surface fastener comprising a double Raschel-knitted base fabric and projecting hook fastening elements on the surface of the base fabric and a foamed resin layer integrally united to the back surface of the hook surface fastener and wherein the foamed resin layer is embedded in the foamed resin body and the surface having the hook fastening elements appears on the seat molded article; and (9) a method of producing a seat which comprises covering the surface of the seat molded article (8) having the engaging member with an upholstery material and engaging the fastening elements of the engaging member with cooperating fastening elements on the back surface of the upholstery material, thereby fixing the upholstery material to the surface of the seat molded article.

Effect of the Invention

The present invention provides a tape-shaped engaging member with good flexibility which is suitable for use in fixing an upholstery material to automobile and vehicle seats, airplane seats, and business or domestic chairs. The tape-shaped engaging member is well flexible and deforms in good conformity with two- or three-dimensionally curved surfaces of various designs, therefore, applicable to the mold-in process.

According to the inventive method of producing the resin molded article having the engaging member, the engaging member is set into the recessed portion of a mold quickly, and the fastening elements are not covered with the foamed resin which constitutes the cushion molded article.

According to the inventive method of producing seats, a seat covered with an upholstery material is produced in a short period of time by covering the surface of the resin molded article having the engaging member produced by the method of the present invention with an upholstery material having cooperating fastening elements on its back surface and engaging the fastening elements.

REFERENCE NUMERALS

Figure 1:
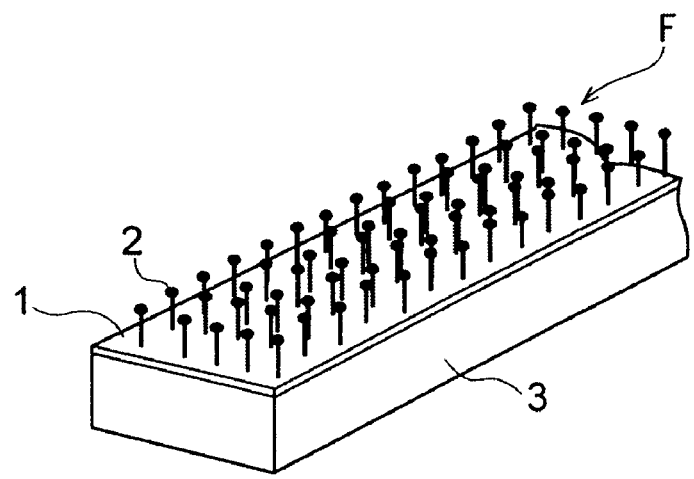
FIG. 1 is a perspective view showing a tape-shaped engaging member of the present invention.

1: Double Raschel-knitted fabric
2: Mushroom-type fastening elements
2': Cooperating fastening elements
3: Foamed resin layer
4: Measuring plane
5: Center-plane floating distance
6: Recessed portion of mold
6a: Three-dimensionally curved groove of mold
10: Resin molded article having engaging member
E: Upholstery material
F: Tape-shaped engaging member
M: Mold

BEST MODE FOR CARRYING OUT THE INVENTION

The hook surface fastener usable in the present invention is made of a fabric and preferably a hook surface fastener made of a fabric in which a base fabric and hook fastening elements are both made by a double Raschel knitting.

Recently, a hook surface fastener having a base fabric made by weaving warp yarns and weft yarns has been generally used. The base fabric of the woven surface fastener has a rigid ground structure. Therefore, the woven surface fastener is hardly deformed in conformity with a curved surface. In the present invention, a surface fastener comprising a base fabric made by double Raschel knitting is used. The base fabric made by double Raschel knitting has a loose ground structure and has enough space between knitted yarns. Therefore, the knitted base fabric is far easily deformed as compared with the woven base fabric.

The fibers for the base fabric made by double Raschel knitting may include polyamide fibers, polyester fibers and polyolefin fibers, with polyolefin fibers, particularly polypropylene monofilaments being preferred as the hook yarn. The fineness of monofilaments for hook yarns is preferably 200 to 600 dtex. Thick monofilaments having a fineness of exceeding 400 dtex create a higher engaging force. The shape of cross section of the monofilaments may be circular, elliptical or polygonal such as triangular, quadrangular and pentagonal. When the cross section of the monofilaments is triangular, quadrangular or pentagonal, the mushroom-type enlarged head to be formed at tip end of the monofilaments has a polygonal cross section, to increase the engaging force as compared with the monofilaments having a circular cross section.

The yarn for forming the knitted ground is preferably a multi-filament yarn, for example, 200 to 300 dtex/30 to 72 filaments (single fiber fineness: 3 to 8 dtex). A base fabric having a knitted ground made of multi-filament yarns of 200 to 300 dtex/30 to 72 filaments (single fiber fineness: 3 to 8 dtex) can provide a tape-shaped engaging member which can cooperate with the engaging member disposed on an upholstery material having various shapes according to the shape of automotive seat, which has a good in-plane flexibility, and which deforms in good conformity with three-dimensionally curved surfaces.

The double Raschel-knitting is performed by using a known double Raschel-knitting machine and technique. In the double Raschel-knitting, monofilaments are used as yarns for connecting two fabrics with Raschel-knitting structure. The double Raschel-knitted fabric is made into two pieces by a center cut method, to form upwardly projecting yarns which are then made into fastening elements. The tip ends of the upwardly projecting yarns are melted by heating with a gas burner or a heat radiation plate, to form hook engaging elements having mushroom-type heads. The mushroom-type hook surface fastener strongly engages with a loop surface fastener and meets the purpose of the present invention in which a strong engagement between the engaging member and the loop surface fastener disposed on the upholstery material is required.

In the double Raschel-knitted hook surface fastener, the height of the fastening elements is preferably 1.0 to 2.0 mm and the hook density is preferably 45 to 65/cm$^2$. The hook surface fastener has a width of preferably 3 to 20 mm and a length of preferably 10 to 200 cm.

The Raschel-knitted hook surface fastener is adhesively bonded with a foamed resin layer on the surface opposite to the hook-formed surface. The foamed resin layer is preferably a foamed urethane layer in view of flexibility and strength and more preferably a flexible foamed polyurethane layer having a high porosity. By integrally uniting the flexible urethane foamed layer and the hook surface fastener which is flexible and deforms in conformity with curved surfaces, the resulting engaging member has a good in-plane flexibility and a good conformity with three-dimensionally curved surfaces.

The polyurethane resin for forming the foamed resin layer is selected from those which will be described below as the example of the resin for cushion.

The foam density of the foamed resin layer is preferably 20 to 100 kg/m$^3$ and particularly preferably about 30 kg/m$^3$. The thickness of the foamed resin layer varies depending on the size of the resin molded article, and preferably 4 to 10 mm and more preferably 5 to 8 mm. The width of the foamed resin layer is preferably nearly the same as that of the hook surface fastener. The length of the foamed resin layer is preferably nearly the same as that of the hook surface fastener. It is preferred that the foamed resin layer and the hook surface fastener integrally united are flush with each other on both the widthwise ends and the lengthwise ends.

The width and length of the tape-shaped engaging member varies depending on the size of the resin molded article to be produced. Generally, the width is preferably 3 to 20 mm and more preferably about 5 to 15 mm, and the length is preferably 10 to 200 cm and more preferably about 15 to 80 cm.

In the production of a seat cushion using the tape-shaped engaging member of the present invention, it is important to allow the liquid resin composition for forming the seat cushion to penetrate at least into the surface portion of the foamed resin layer in the engaging member and harden there. If the penetration and hardening are insufficient, the engaging member may easily peel off the seat cushion. Therefore, it is preferred that the porosity of the foamed resin layer is high. Thus, a resin foam, particularly an urethane foam having a porosity of 90 to 98% is preferably used in the engaging member.

As described above, the tape-shaped engaging member of the invention is produced by adhesively bonding the foamed resin layer to the hook surface fastener composed of the double Raschel-knitted base fabric and the fastening elements. The hook surface fastener and the foamed resin layer are structurally loose and have a number of voids. Therefore, an adhesive or a hot-melt adhesive generally used penetrates into the base fabric in an excessive amount to form a thick and hard adhesive layer, thereby making it difficult in some cases to obtain a flexible engaging member intended in the present invention. To avoid this drawback, a thin and flexible adhesive layer is preferably formed in the present invention. Examples of the adhesive suitable for such purpose include acrylic resin emulsion adhesives, urethane resin adhesives, urethane resin emulsion adhesives, ethylene-vinyl acetate resin hot-melt adhesives, epoxy resin adhesives, silicone resin adhesives, nitrile rubber adhesives, reactive hot-melt adhesives, polyamide resin hot-melt adhesives, and polyurethane resin hot-melt adhesives. A blend mainly composed of the above adhesive and a polymer such as nylon and isocyanate polymer or a crosslinking agent may be used. The thickness of the adhesive layer is preferably 0.01 to 0.5 mm.

In a preferred bonding method, the adhesive may be applied in dotted pattern or applied in foamed state.

In another preferred method, the foamed resin layer is melt-bonded to the base fabric by flame treatment, i.e., by flame lamination. In the flame lamination, the surface of the foamed resin layer is heated by flame or electrical heater to melt only its surface portion, and then, the Raschel-knitted fabric is laminated by press contact with the molten surface. In the melt-bonding method, a hard adhesive layer is avoided and only the thin surface layer of the foamed resin layer is hardened. Therefore, the foamed resin layer and the melt-bonded Raschel-knitted fabric are little hardened, thereby maintaining the whole engaging member flexible. A certain degree of the bonding strength between the foamed resin layer and the Raschel-knitted fabric is required. Therefore, the degree of flame lamination is determined by considering both the retention of flexibility and the bonding strength.

The in-plane flexibility of the tape-shaped engaging member is expressed by a center-plane floating distance which is determined by bending the tape-shaped engaging member along a ¼ circular arc with a ¹⁄₄₀ mm curvature on a plane. The tape-shaped engaging member of the invention may have an center-plane floating distance of 2.0 mm or less. The tape-shaped engaging member and the in-plane flexibility will be described below with reference to the attached drawings.

FIG. 1 is a perspective view showing a tape-shaped engaging member F of the present invention. In FIG. 1, a number of upright mushroom-type fastening elements 2 are provided on the surface of a double Raschel-knitted fabric. The hook surface fastener is integrally united with a foamed resin layer 3 on its surface opposite to the surface provided with the fastening elements.

Figure 2:
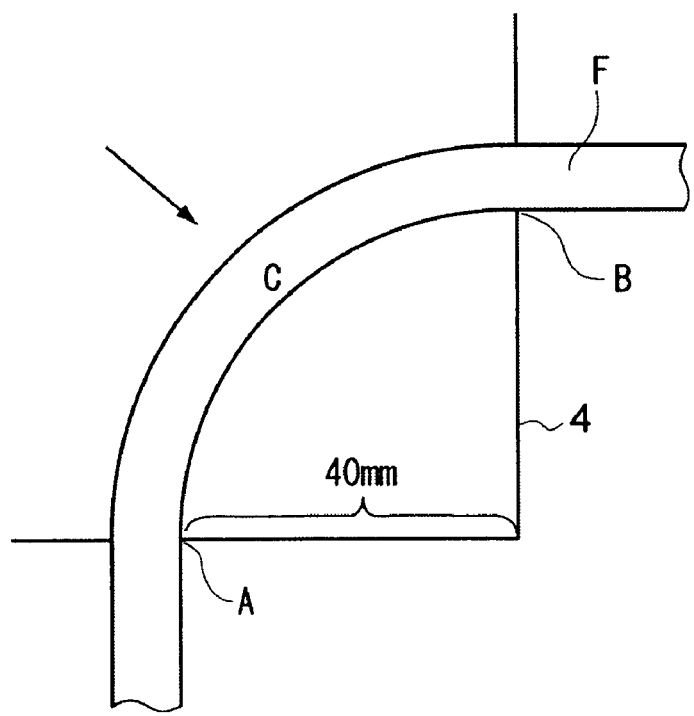
FIG. 2 is a schematic view illustrating a ¼ circular arc for determining the in-plane flexibility.

FIG. 2 is a schematic view illustrating a method of determining the in-plane flexibility. As shown in FIG. 2, a circular arc A-B (central angle: 90°) with a radius of 40 mm is drawn on a plane 4. A test tape-shaped engaging member F is bent while allowing the inner lateral side of the foamed resin layer to bend along the arc and keeping the surface fastener (fastening elements 2) up. Generally, the hook surface fastener is less elastic and difficult to bend as compared with the foamed resin layer. Therefore, the upper surface (surface fastener) of the tape-shaped engaging member inclines to the center of the arc. This allows the lower edge of the outer lateral surface of the arced tape-shaped engaging member F to rise from the plane to leave the space between the plane 4 and the lower edge of the outer lateral surface. The center-plane floating distance referred to in the present invention is the floating distance of the lower edge of the outer lateral surface of the arced tape-shaped engaging member from the plane 4 at the central position C of the arc A-C-B when viewing from the direction shown by the arrow. If the hook surface fastener is less flexible, the lower edge of the outer lateral surface rises largely to increase the center-plane floating distance 5.

The foamed resin layer in the test tape-shaped engaging member F has a thickness of 3 to 10 mm, preferably 5 to 8 mm, and a width of 5 to 15 mm. It is preferred to fix the arced tape-shaped engaging member at the positions A and B on the plane 4 by a tape for measuring the center-plane floating distance.

Figure 3:
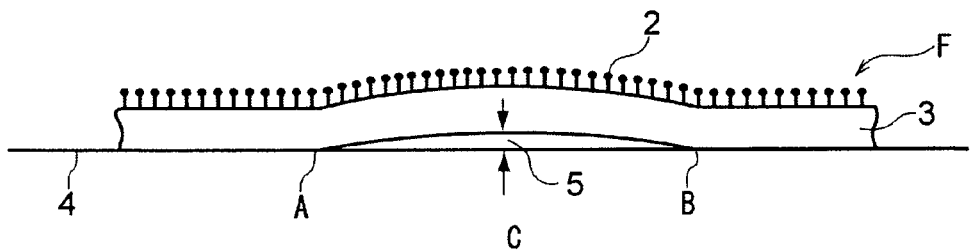
FIG. 3 is a schematic view showing a tape-shaped engaging member fixed on a measuring surface when observed from the direction shown by the arrow in FIG. 2.

FIG. 3 is a schematic view showing a tape-shaped engaging member F fixed on a measuring surface when observed from the direction shown by the arrow in FIG. 2. Upon bending, the foamed resin layer 3 of the arced tape-shaped engaging member F rises from the flat plane 4 according its flexibility. The degree of rising is largest at the central portion C of the circular arc. The floating distance 5 becomes larger as the flexibility is lower.

When measured by the above method, the center-plane floating distance 5 of the tape-shaped engaging member of the invention is preferably 2.0 mm or less and more preferably 1.5 mm or less. If exceeding 2.0 mm, the flexibility is poor and the bending in plane is difficult.

A method of producing a seat molded article using the tape-shaped engaging member of the invention will be described below. FIGS. 4A to 4D are schematic views illustrating the foamed resin molded article 10 (seat cushion body) equipped with the tape-shaped engaging member and a production method thereof. The tape-shaped engaging member F is placed in a groove 6a in a recessed portion 6 of a mold M (partly shown) with a fastening elements 2 facing toward the bottom of the recessed portion (see FIG. 4C). The recessed portion 6 is formed according to the design of seat cushion body so as to cooperate with the engaging member provided on the upholstery material.

Figure 4A:
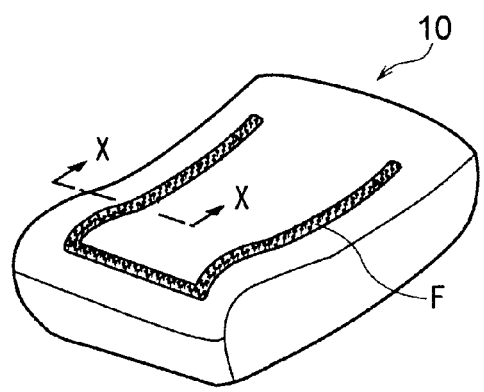
FIG. 4A is a schematic view showing a resin molded article having an engaging member (cushion body for seat) of the present invention.
Figure 4B:
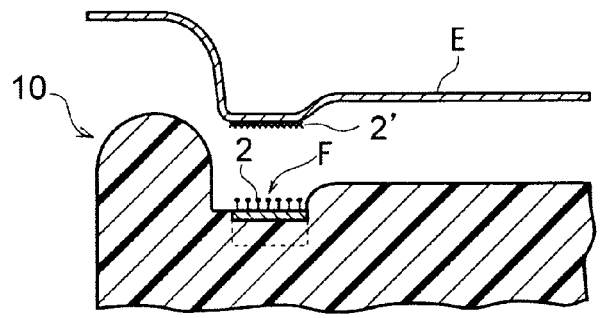
FIG. 4B is a cross-sectional view showing the resin molded article having the engaging member taken along the line X-X in FIG. 4A and an upholstery material to be fixed to the resin molded article.
Figure 4C:
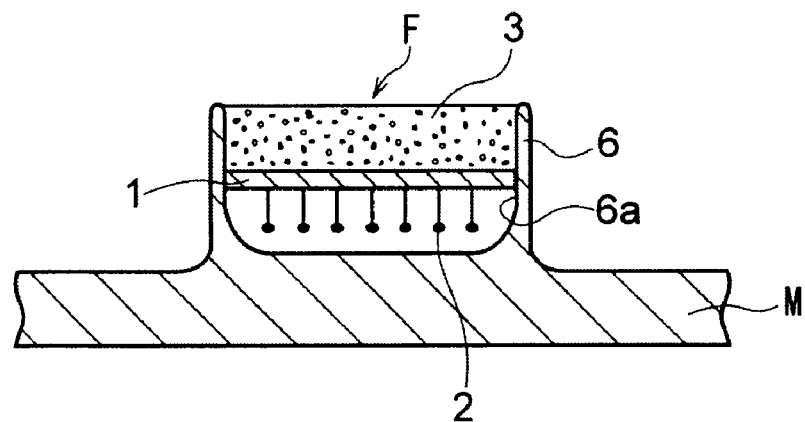
FIG. 4C is an enlarged view showing a recessed portion of a mold.
Figure 4D:
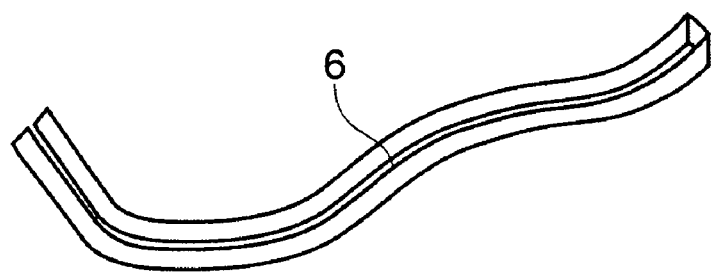
FIG. 4D is a schematic view showing a curved recessed portion (groove) of a mold, into which an engaging member is set to produce the resin molded article having the engaging member shown in FIG. 4A.

The groove shown in FIG. 4D is a part of the groove in the seat cushion body of FIG. 4A. When the recessed portion 6 disposed in the mold M is three-dimensionally and complicatedly bent as shown in FIGS. 4A and 4D, the tape-shaped engaging member F is particularly effective. In the conventional technique, when the recessed portion 6 bends widthwise, the engaging member are cut into short lengths and many pieces of short engaging members are fit into the recessed portion along its bending shape. In contrast, since the tape-shaped engaging member of the invention easily bends widthwise in addition to lengthwise, the use of only one piece of tape-shaped engaging member without cutting is possible because it bends widthwise and lengthwise according to the bending shape of the recessed portion. Therefore, the setting operation of the engaging member into the recessed portion is extremely facilitated as compared with the conventional technique. The recessed portion should have a depth enough to receive the whole part of the hook fastening elements and also receive the whole part or part of the foamed resin layer. If not, the foamable resin liquid introduced into the mold may enter into the hook fastening elements and cover the fastening elements, thereby deteriorating the engaging function.

The relationship between the width of the foamed resin layer and the width of the recessed portion is important for fixed insert the tape-shaped engaging member into the recessed portion and for preventing the foamable resin liquid to form the cushion body from covering the fastening elements.

When the width of the recessed portion is the same or slightly narrower than the width of the foamed resin layer, the engaging member set in the recessed portion does not easily get out of its place and no space is left between the recessed portion and the foamed resin layer, thereby preventing the foamable resin liquid from entering into the mold and covering the fastening elements.

After setting the tape-shaped engaging member into the recessed portion, a predetermined amount of a molding resin liquid (foamable resin liquid) is introduced into the mold. The resin liquid is cured and then the resulting molded article (cushion body) is released from the mold, thereby obtaining the foamed resin molded article (seat molded article) having the engaging member with its fastening elements substantially not covered with the resin.

The foamed resin molded article equipped with the engaging member is applicable to the production of vehicle seats such as automobile seats, airplane seats and particularly high class automobile seats. Examples of the foamable resin compositions include various types of synthetic resins, and polyurethane resin compositions are preferably used in view of the adhesion strength with the foamed resin layer, the stability of foams, the elasticity and the durability.

Known foamable polyurethane compositions are suitably used as the polyurethane resin composition. The hardness of the cured product thereof may be adjusted according to the known technique.

The foamable polyurethane is produced by blending an organic polyisocyanate with a polyol or a polymer polyol containing dispersed polymer particles obtained by the radical polymerization of acrylonitrile or styrene in a polyol, a foaming agent such as water, a foam stabilizer such as silicone surfactant, a catalyst such as amine and tin compound, and optional components such as a crosslinking agent, a flame retardant, pigment and various stabilizers. Specific example of the polyol include a polyether polyol having an average molecular weight of 400 to 10000 and preferably 1500 to 6000, which is produced by the addition of propylene oxide or ethylene oxide to polyglycerin. Specific examples of the polyisocyanate include 2,4- or 2,6-tolylene diisocyanate and 4,4'-diphenylmethane diisocyanate. Examples of the amine include tertiary amines such as triethylamine, tributylamine and dimethylethanolamine. Example of the tin compound include dibutyltin laurate.

The commercially available liquid for forming foamed urethane is a two-pack type which is composed of a liquid containing polyol added with water, catalyst, etc. and a liquid containing isocyanate. Generally, two packs of liquids are mixed under stirring just before introducing into the mold and the mixed liquid is immediately introduced into the mold to conduct the polymerization and molding simultaneously with the foaming.

The method of producing a seat of the invention comprises superposing an upholstery material on the resin molded article equipped with the engaging member which is produced by the above method; and engaging the fastening elements of the engaging member with the cooperating fastening elements on the back surface of the upholstery material, thereby fixing the upholstery material to the resin molded article. The upholstery material may include fabrics and leathers. By engaging the fastening elements of the engaging member in the resin molded article with the cooperating fastening elements on the back surface of the upholstery material, the upholstery material is fixed to the surface of the foamed resin molded article.

According to the method of producing a seat of the invention, the seat molded article having a seating portion and backrest with curved shapes is covered with the upholstery material in a high efficiency without deteriorating the design.

INDUSTRIAL APPLICABILITY

The tape-shaped engaging member with good flexibility of the invention is suitable for use in fixing an upholstery material to automobile and vehicle seats, airplane seats, and business or domestic chairs. The tape-shaped engaging member is well flexible and deforms in good conformity with two- or three-dimensionally curved surfaces of various designs, therefore, applicable to the mold-in process.

The method of producing a foamed resin molded article equipped with the engaging member of the invention is applicable to the production of a cushion body of automotive seats, airplane seats and particularly high class automotive seats which have high performance design, i.e., have a seating portion and backrest with curved shapes.

The method of producing a seat of the invention is applicable to the production of automotive seats, airplane seats and particularly high class automotive seats which have high performance design, i.e., have a seating portion and backrest with curved shapes.

What is claimed is:

1. A tape-shaped engaging member for fixing an upholstery material to seats, which comprises:
    a hook surface fastener including a double Raschel-knitted base fabric and projecting hook fastening elements on a surface of the base fabric; and
    a foamed resin layer integrally joined to a back surface of the hook surface fastener, wherein
    the hook fastening elements are mushroom-type fastening elements that are melted tip ends of cut monofilaments of yarns connecting two Raschel-knitted fabrics of the double Raschel-knitted base fabric, the cut monofilaments projecting outwardly from the double Raschel-knitted base fabric.

2. The tape-shaped engaging member according to claim 1, wherein a height of the hook fastening elements is 1.0 to 2.0 mm and a density of the hook fastening elements is 45 to 65/cm$^2$.

3. The tape-shaped engaging member according to claim 1, wherein the foamed resin layer is a foamed polyurethane layer.

4. The tape-shaped engaging member according to claim 1, wherein an in-plane flexibility of the tape-shaped engaging member is 2.0 mm or less when expressed by a center-plane floating distance which is a distance between a plane and a central portion of an arced tape-shaped engaging member determined by bending the tape-shaped engaging member along a ¼ circular arc with a ¹/₄₀ mm curvature on the plane.

5. A method of producing a resin molded article having an engaging member, which comprises:
    setting the tape-shaped engaging member as defined in claim 1 in a recessed portion disposed in a mold with the surface having the fastening elements facing toward a bottom the recessed portion;
    introducing a foamable resin into the mold; allowing the foamable resin to foam and solidify to form a molded article having the engaging member; and
    releasing the molded article having the engaging member from the mold.

6. The method according to claim 5, wherein a width of the recessed portion is the same as or slightly narrower than a width of the foamed resin layer integrally joined to the back surface of the hook surface fastener, and the foamed resin layer is inserted into the recessed portion when setting the engaging member into the recessed portion.

7. A seat molded article made of a foamed resin body, which comprises:
    a tape-shaped engaging member in a predetermined portion of the seat molded article, wherein the tape-shaped engaging member includes
    a hook surface fastener including a double Raschel-knitted base fabric and projecting hook fastening elements on a surface of the base fabric, and
    a foamed resin layer integrally joined to a back surface of the hook surface fastener, and wherein
    the foamed resin layer is embedded in the foamed resin body and the hook fastening elements appear on the seat molded article.

8. A method of producing a seat, which comprises:
    covering the surface of the seat molded article having the engaging member as defined in claim 7 with an upholstery material; and
    engaging the hook fastening elements of the engaging member with cooperating fastening elements on a back surface of the upholstery material, thereby fixing the upholstery material to the surface of the seat molded article.

9. The tape-shaped engaging member according to claim 1, wherein the cut monofilaments of the yarns include a fineness of 200 to 600 dtex.

10. The tape-shaped engaging member according to claim 1, wherein the double Raschel-knitted base fabric includes a knitted ground made of multi-filament yarns of 200 to 300 dtex/30 to 72 filaments.

11. The tape-shaped engaging member according to claim 1, wherein the foamed resin layer includes a density of 20 to 100 kg/m$^3$.

12. The tape-shaped engaging member according to claim 1, wherein the foamed resin layer includes a porosity of 90 to 98%.

13. The tape-shaped engaging member according to claim 1, wherein the foamed resin layer includes a thickness of 4 to 10 mm.

14. The tape-shaped engaging member according to claim 1, further comprising a flexible adhesive layer that integrally joins the foamed resin layer to the back surface of the hook surface fastener, the flexible adhesive layer including a thickness of 0.01 to 0.5 mm.

15. The tape-shaped engaging member according to claim 1, wherein a melted surface of the foamed resin layer integrally joins the foamed resin layer to the back surface of the hook surface fastener.

* * * * *